(12) United States Patent
Haddy

(10) Patent No.: US 10,132,951 B2
(45) Date of Patent: Nov. 20, 2018

(54) DETECTION OF BURIED ASSETS USING DRONE APPARATUS

(71) Applicant: Alan Haddy, Naples, FL (US)

(72) Inventor: Alan Haddy, Naples, FL (US)

( * ) Notice: Subject to any disclaimer, the term of this patent is extended or adjusted under 35 U.S.C. 154(b) by 142 days.

(21) Appl. No.: 15/391,507

(22) Filed: Dec. 27, 2016

(65) Prior Publication Data

US 2017/0108609 A1 Apr. 20, 2017

Related U.S. Application Data

(63) Continuation-in-part of application No. 14/835,417, filed on Aug. 25, 2015, now Pat. No. 9,759,833, which is a continuation-in-part of application No. 14/720,340, filed on May 22, 2015, now Pat. No. 9,116,251, which is a continuation-in-part of application No. 14/519,910, filed on Oct. 21, 2014, now abandoned, which is a continuation-in-part of application No. 14/226,397, filed on Mar. 26, 2014, now Pat. No. 8,872,626, which is a continuation-in-part of application No. 14/060,301, filed on Oct. 22, 2013, now Pat. No. 8,823,492.

(51) Int. Cl.
| | | |
|---|---|---|
| *G01C 21/00* | (2006.01) |
| *G01V 3/08* | (2006.01) |
| *B64C 39/02* | (2006.01) |
| *G01S 19/13* | (2010.01) |
| *G08G 5/00* | (2006.01) |
| *G01V 3/12* | (2006.01) |
| *G01V 3/165* | (2006.01) |
| *G01V 3/38* | (2006.01) |
| *H04Q 9/00* | (2006.01) |
| *H04W 84/02* | (2009.01) |
| *H04L 29/06* | (2006.01) |
| *G01V 3/15* | (2006.01) |

(52) U.S. Cl.
CPC .............. *G01V 3/08* (2013.01); *B64C 39/024* (2013.01); *G01S 19/13* (2013.01); *G01V 3/12* (2013.01); *G01V 3/165* (2013.01); *G01V 3/38* (2013.01); *G08G 5/0069* (2013.01); *H04Q 9/00* (2013.01); *G01V 3/15* (2013.01); *H04L 67/42* (2013.01); *H04Q 2209/50* (2013.01); *H04W 84/02* (2013.01)

(58) Field of Classification Search
CPC ... G01V 3/08; G01V 3/12; G01V 3/38; G01V 3/165; G01V 3/15; H04Q 9/00; H04Q 2209/50; B64C 39/024; G08G 5/0069; G01S 19/13; H04W 84/02; H04L 67/42
See application file for complete search history.

(56) References Cited

U.S. PATENT DOCUMENTS

2017/0108609 A1* 4/2017 Haddy .................... G01V 3/08
2018/0074519 A1* 3/2018 Qin ....................... B64C 39/024

\* cited by examiner

*Primary Examiner* — Ian Jen
(74) *Attorney, Agent, or Firm* — Mark Terry

(57) ABSTRACT

An unmanned aerial vehicle (UAV) for detecting buried assets includes a chassis, a global navigation receiver and processor, an electromagnetic locator device (ELD), and a processor for receiving a first data structure that represents a two dimensional area comprising a buffer zone at an above-surface location, wherein the buffer zone corresponds to a particular buried asset sought by the UAV, navigating towards the buffer zone and executing a detection process for storing a plurality of buried asset data points, and transmitting the buried asset data points.

18 Claims, 6 Drawing Sheets

DETECTION OF BURIED ASSETS USING DRONE APPARATUS

CROSS-REFERENCE TO RELATED APPLICATIONS

This patent application is a continuation in part of, and claims priority to, patent application Ser. No. 14/835,417 filed Aug. 25, 2015, which is a continuation in part of, and claims priority to, patent application Ser. No. 14/720,340 filed May 22, 2015, which is a continuation in part of, and claims priority to, patent application Ser. No. 14/519,910 filed Oct. 21, 2014, which is a continuation in part of, and claims priority to, patent application Ser. No. 14/226,397 filed Mar. 26, 2014, which is a continuation in part of, and claims priority to, patent application Ser. No. 14/060,301 filed Oct. 22, 2013. The subject matter of patent application Ser. Nos. 14/835,417, 14/720,340, 14/060,301, 14/226,397 and 14/519,910 are hereby incorporated by reference in their entirety.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

TECHNICAL FIELD

The technical field relates generally to the detection and identification of buried assets (i.e., underground utility lines) and, more specifically, to processes for improving the efficiency of detection of buried assets.

BACKGROUND

Utility lines, such as lines for telephones, electricity distribution, natural gas, cable television, fiber optics, Internet, traffic lights, street lights, storm drains, water mains, and wastewater pipes, are often located underground. Utility lines are referred to as "buried assets" herein. Consequently, before excavation occurs in an area, especially an urban area, an excavator is typically required to clear excavation activities with the proper authorities and service providers. The clearance procedure usually requires that the excavator contact a central authority (such as "One Call", "811" and "Call Before You Dig," which are well known in the art) which, in turn, sends a notification to the appropriate utility companies. Subsequently, each utility company must perform a buried asset detection procedure, which includes having a field technician visit the proposed excavation site, detecting the relevant buried assets and physically marking the position of the buried asset using temporary paint or flags. Usually, a technician visiting a proposed excavation site utilizes a device known as a conventional locator—a commercial, off-the-shelf, utility locator device that detects and identifies buried assets using radio frequency and/or magnetic sensors. Upon completion of this procedure by the appropriate utility companies, excavation can occur with the security that buried assets will not be damaged.

Utility companies are faced with increasing requests to locate and mark the position of their buried assets to avoid damage from third party excavators, contractors and underground horizontal boring operations. These processes require the services of very experienced and skilled technicians that can detect buried assets. This brings up major issues of manpower and the financial resources required to meet said manpower requirements. With experienced technicians in short supply, utility companies do not have the resources to attend to all such situations that are presented. Furthermore, even for experienced and skilled technicians, finding target buried assets can be time-consuming and cost intensive. As such, this leads to increased manpower costs for utility companies and service providers, as well as potential safety hazards to workers and the general public.

Therefore, a need exists for improvements over the prior art, and more particularly for more efficient methods and systems for detecting and locating buried assets.

SUMMARY

An unmanned aerial vehicle (UAV) for detecting buried assets is provided. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, a UAV for detecting buried assets, the UAV comprising: a UAV chassis; a global navigation satellite system (GNSS) receiver and processor positioned on the chassis, the GNSS receiver and processor configured for determining an above-surface location of the UAV; an electromagnetic locator device (ELD) positioned on the chassis, the ELD configured for executing electromagnetic locating functions for detecting buried assets; a processor positioned on the chassis, the processor communicatively coupled with a wireless communications network, the UAV, the GNSS receiver and processor, and the ELD, the processor configured for: executing a navigation process comprising: i) receiving, via the wireless communications network, a first data structure that represents a two dimensional area comprising a buffer zone at an above-surface location, wherein the buffer zone corresponds to a particular buried asset sought by the UAV; and ii) navigating towards the buffer zone; executing a status process comprising: i) calculating an above-surface location of the UAV using the GNSS receiver and processor; ii) determining whether the above-surface location of the UAV is located within the two dimensional area represented by the first data structure; iii) if the above-surface location is located within the two dimensional area, executing the electromagnetic locating functions of the ELD; and executing a detection process comprising: i) receiving and storing a plurality of buried asset data points, wherein each buried asset data point comprises a geographical coordinate for the particular buried asset, wherein the plurality of buried asset data points correspond to analog radio frequency signals that were detected and read from the particular buried asset at the above-surface location; and ii) transmitting, via the wireless communications network, the buried asset data points.

BRIEF DESCRIPTION OF THE DRAWINGS

The accompanying drawings, which are incorporated in and constitute a part of this disclosure, illustrate various example embodiments. In the drawings.

DETAILED DESCRIPTION

Figure 1:
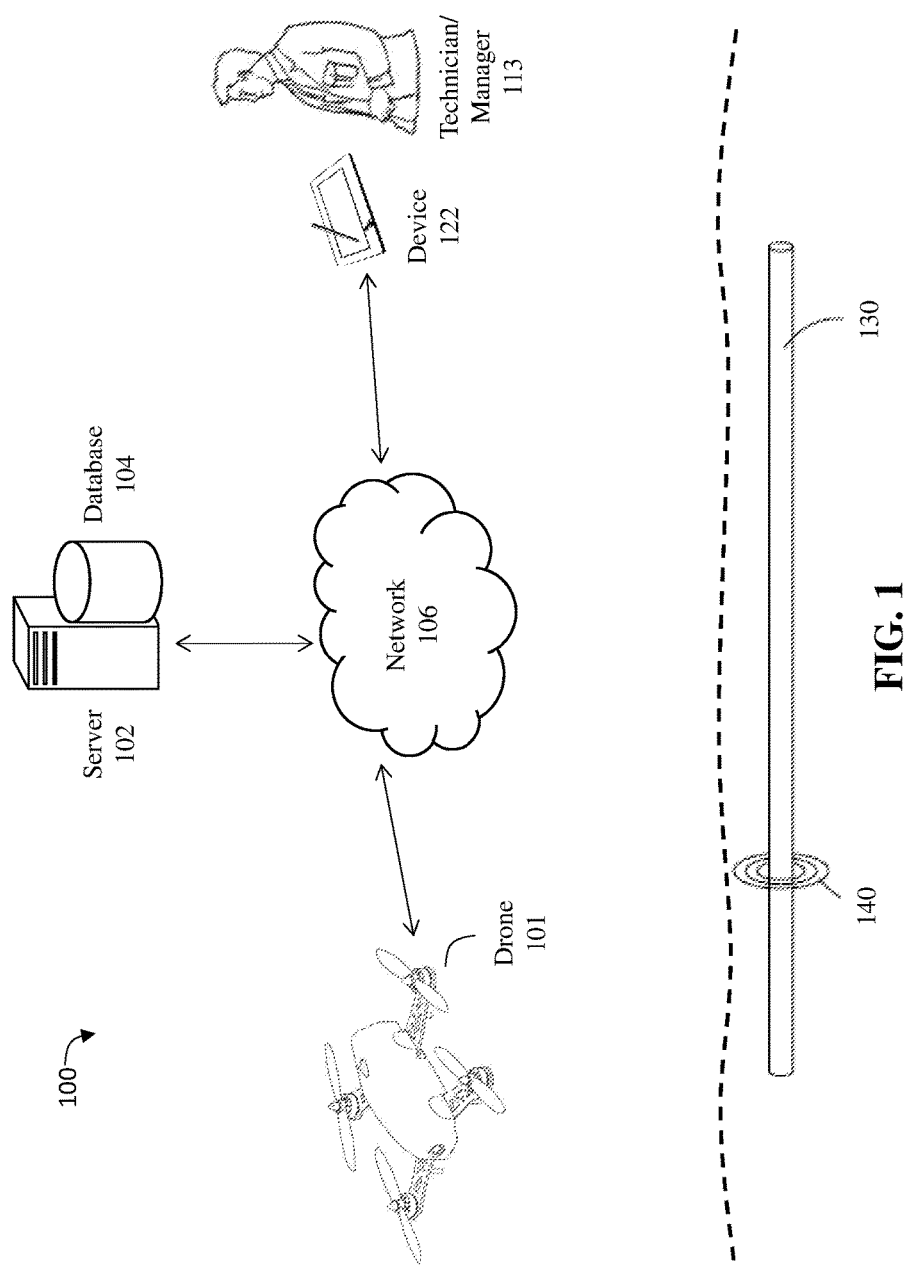
FIG. 1 is a diagram of an operating environment that supports a drone for detecting buried assets, according to an example embodiment.

The following detailed description refers to the accompanying drawings. Wherever possible, the same reference numbers are used in the drawings and the following description to refer to the same or similar elements. While embodiments may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the claimed subject matter. Instead, the proper scope of the claimed subject matter is defined by the appended claims.

The claimed subject matter improves over the prior art by providing a more efficient, safe and precise way of locating a particular buried asset using an unmanned aerial vehicle (UAV), which saves manpower, time and resources. The claimed subject matter also improves over the prior art by utilizing previously stored buried asset data to improve buried asset detection by the UAV. The example embodiments leverage the wide availability of geographical location processors (such as GPS processors and other satellite or ground-based navigation systems) that provide geographical location information, as well as previously stored two-dimensional or three-dimensional buffer zones around a target buried asset, to facilitate the locating functions of an electromagnetic pipe or cable locator device according to the device's geographical location. The claimed subject matter decreases manpower costs associated with buried asset detection, as well as errors attributed to human operators.

FIG. 1 is a diagram of an operating environment 100 that supports an unmanned aerial vehicle (UAV) or drone 101 for detecting buried assets. The server 102 may be communicatively coupled with a communications network 106, according to an example embodiment. The environment 100 may comprise a drone 101, which may communicate with server 102 via a communications network 106. Drone 101 may comprise a mobile computing device connected wirelessly to the communications network 106. Communications network 106 may be a packet switched network, such as the Internet, or any local area network, wide area network, enterprise private network, cellular network, phone network, mobile communications network, radio network, or any combination of the above.

The environment 100 shows that mobile computing device 122 is operated by a technician (i.e., a field technician) or manager 113. Device 122 is a mobile or stationary computing device and may be coupled with network 106 wirelessly or in a wired fashion. As such, drone 101, server 102, and device 122 may each comprise a computing device 600, described below in greater detail with respect to FIG. 6. Drone 101 may include an electromagnetic locator device (ELD) including one or more sensors that detect and measure radio frequency and/or electromagnetic signals 140 emanating from a buried asset 130. In one embodiment, drone 101 includes all of the functions of a conventional ELD, which is well known in the art.

In another embodiment, the drone 101 also calculates its current geographical position using an on-board processor or a connected processor and transmits it to the server 102 over network 106. In one embodiment, the drone 101 calculates its current position using a satellite or ground based positioning system (or global navigation satellite system—GNSS), such as the Global Positioning System (GPS) system, which is a navigation device that receives satellite or land based signals for the purpose of determining the device's current geographical position on Earth. A GPS receiver, and its accompanying processor, may calculate latitude, longitude and altitude information. In this embodiment, a radio frequency signal is received from a satellite or ground based transmitter comprising a time the signal was transmitted and a position of the transmitter. Subsequently, the done 101 calculates current geographical location data of the drone based on the signal, and stores/transmits the current geographical location data to the server 102 via the communications network 106. In another embodiment, the drone 101 calculates its current geographical location using alternative services, such as control plan locating, GSM localization, dead reckoning, or any combination of the aforementioned position services. In yet another embodiment, the drone 101 also calculates its current compass heading (such as via the use of a compass application) and transmits this data to the server 102 over network 106. In one embodiment, in addition to satellite(s), drone 101 may collect data from other sources, such as land-based position data providers that broadcast position data over radio frequency, or additional constellations of satellites.

Server 102 includes a software engine that delivers applications, data, program code and other information to drone 101 and device 122. The software engine of server 102 may perform other processes such as transferring multimedia data in a stream of packets that are interpreted and rendered by a software application as the packets arrive. FIG. 1 further shows that server 102 includes a database or repository 104, which may be a relational database comprising a Structured Query Language (SQL) database stored in a SQL server. Mobile computing device 122 and drone 101 may also include their own database, either locally or via the cloud. The database 104 may serve buried asset data, buffer zone data, as well as related information, which may be used by server 102, drone 101 and mobile computing device 122.

Server 102, mobile computing device 122 and drone 101 may each include program logic comprising computer source code, scripting language code or interpreted language code that perform various functions of the claimed subject matter. In one embodiment, the aforementioned program logic may comprise program module 607 in FIG. 6. It should be noted that although FIG. 1 shows only one mobile computing device 122, one drone 101 and one server 102, the system disclosed herein supports any number of servers, drones and mobile computing devices connected via network 106. Also note that although server 102 is shown as a single and independent entity, in one embodiment, server 102 and its functionality can be realized in a centralized fashion in one computer system or in a distributed fashion wherein different elements are spread across several interconnected computer systems.

Environment 100 may be used when a drone 101 and a mobile computing device 122 engages in buried asset detection activities that comprise reading, generating, and storing buried asset data. Various types of data may be stored in the database 104 of server 102 with relation to a buried asset that has been detected and located. For example, the database 104 may store one or more records for each buried asset, and each record may include one or more buried asset data points. A buried asset data point may include a current time, a textual map address, and location data or position data, such as latitude and longitude coordinates, geographical coordinates, an altitude coordinate, or the like. A buried asset data point may also include depth measurement data, electromagnetic signal measurement data (such as electrical current measurement data, resistance measurement data, impedance measurement data, electrical signal magnitude measurement data, electrical signal frequency measurement data, electrical signal voltage measurement data, etc.), direction data and orientation data.

A buried asset data point may also include a precision data value corresponding to any piece of information associated with a buried asset data point, such as the geographical coordinate or. A precision data value is a value that represents the quality or level of precision of a piece of information, such as a geographical coordinate. All sensors and devices that read physical quantities have a certain amount of measurement error or observational error. A precision data value represents the amount or magnitude of the measurement error or observational error of a sensor or device at one time. In one embodiment, a precision data value is a numerical value, such as a real number from 0 to 1.0 (with a variable number of decimal points) wherein zero represents perfect precision, 0.5 represents a precision that is 50% off from a true value, 0.75 represents a precision that is 75% off from a true value, etc. In another embodiment, a precision data value is an alphanumeric value (such as a word or other ASCII string) that corresponds (according to a lookup table or other correspondence table) to a predefined amount of precision. In another embodiment, a precision data value is any set of values that may be sorted according to ascending or descending value. Thus, in this embodiment, precision data values may have ascending and descending values.

In one embodiment, the precision data value is inversely proportional to the level of precision of quality of a piece of information, such as a geographical coordinate. Thus, when there is a large margin of error or a low confidence level in a piece of information, then the precision data value is high and the quality or level of precision of the information is low. Conversely, when there is a small margin of error or a high confidence level in a piece of information, then the precision data value is low and the quality or level of precision of the information is high.

With regard to geographical coordinates, HDOP, VDOP, PDOP, and TDOP values (Horizontal, Vertical, Positional and Time Dilution of Precision, respectively) are values well known in the art for representing the quality or level of precision of a geographical coordinate. Also with regard to geographical coordinates, values representing the quality or level of precision of a geographical coordinate may rely on whether a differential correction technique (such as differential GPS) was used in calculating the coordinate. The Differential Global Positioning System (DGPS) is an enhancement to Global Positioning System that provides improved location accuracy. DGPS uses a network of fixed, ground-based reference stations to broadcast the difference between the positions indicated by the satellite systems and the known fixed positions. As such, if DGPS was used to calculate a geographical coordinate, then the precision data value of the coordinate may reflect that fact. For example, the precision data value may indicate higher accuracy if DGPS was used.

Similarly, a buried asset data point may also include a precision data value corresponding to any piece of information associated with a buried asset data point, such as a current time, a textual map address, depth measurement data, electrical signal measurement data (such as electrical current measurement data, signal strength data, resistance measurement data, impedance measurement data, electrical signal magnitude measurement data, electrical signal frequency measurement data, electrical signal voltage measurement data, electromagnetic vector data, etc.), direction data (left or right indicators that direct the technician to the location of the buried asset), orientation data, and location data or position data, such as latitude and longitude coordinates, geographical coordinates, an altitude coordinate, or the like.

In another example, the database 104 may store one or more records for each buffer zone. A buffer zone may be a two dimensional area situated at an above ground location that defines a general area in which excavators must take extra caution in order to avoid an incursion with a buried asset. More specifically, a buffer zone may be a bounded two dimensional area that defines an area of ground on Earth, wherein the bound is a border or perimeter of the two dimensional area. A buffer zone may also include one or more geographical coordinates that define one or more points in the buffer zone. In one embodiment, a two dimensional buffer zone may be stored as a data structure that defines a locus of points describing the two dimensional area. In another embodiment, a two dimensional buffer zone may be stored as a data structure that defines a set of points describing the border or perimeter of the two dimensional area. Each point in said data structure may be associated with a geographical coordinate. In another embodiment, a two-dimensional buffer zone may be represented in a data structure 304 as a set of shapes (such as circles, squares, triangles, rectangles, trapezoids, etc.) that define the buffer zone area, wherein each shape is represented by a set of points that define its perimeter, its vertices, it center, its radius, etc.

A buffer zone may also be a three dimensional area situated at an above and below ground location that defines a general volume in which excavators must take extra caution in order to avoid an incursion with a buried asset. More specifically, a buffer zone may be a bounded three dimensional area that defines a volume on Earth, wherein the bound is a surface or exterior boundary of the three dimensional volume. In one embodiment, a three dimensional buffer zone may be stored as a data structure that defines a locus of points describing the three dimensional volume (within the surface boundary and on the surface boundary). In another embodiment, a three dimensional buffer zone may be stored as a data structure that defines a set of points describing the surface boundary of the three dimensional volume. Each point in said data structure may be associated with a geographical coordinate.

Figure 2:
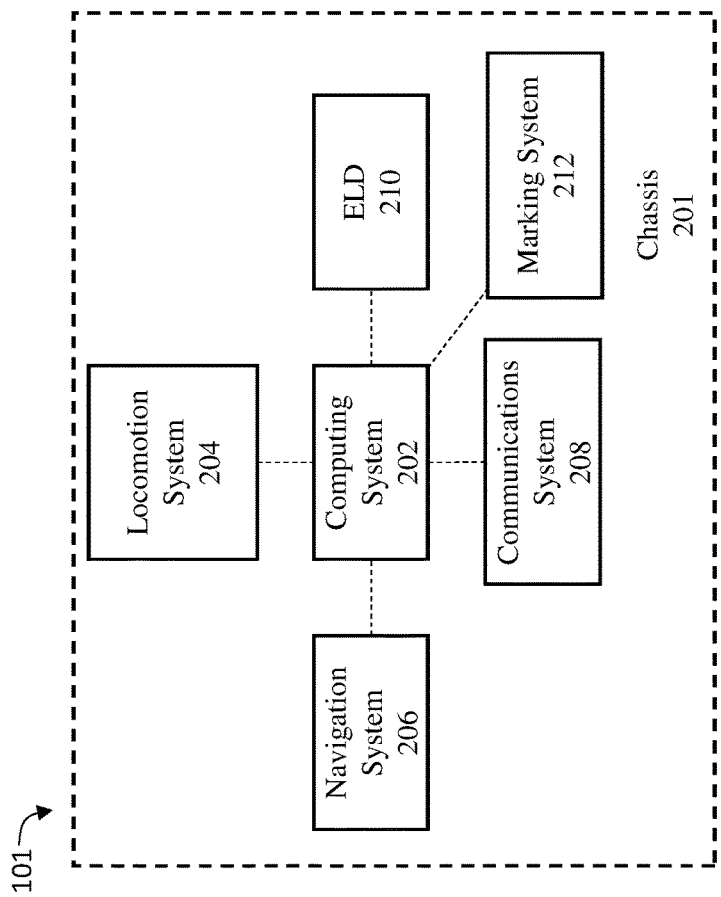
FIG. 2 is a block diagram showing the main components of a drone for detecting buried assets, according to an example embodiment.

FIG. 2 is a block diagram showing the main components of a drone 101 for detecting buried assets, according to an example embodiment. FIG. 2 shows that drone 101 includes a chassis 201 on which is located a computing system 202

(described more fully with regard to FIG. 6 below), a locomotion system 204 (which is well known in the art for UAVs), a navigation system 206 (which is well known in the art for aerial vehicles generally and UAVs), an electromagnetic locator device (ELD) 210 and a communications system 208 including a transmitter and receiver for transmitting and receiving radio frequency signals to and from other nodes, such as server 102.

FIG. 2 also shows that the chassis includes a marking system 212. The marking system is configured to make physical markings on the ground at an above-surface location during execution of a buried asset detection process. The marking system may be configured to place spray paint markings and/or bright colored flags on the ground at an above-surface location during execution of a buried asset detection process. In one embodiment, the system 212 may include an automatically activated spray paint system that, when activated, sprays brightly colored paint on the ground. Typically, this occurs when the ELD 210 has detected the presence of a buried asset at an above-surface location. Thus, the spray paint is placed at the above surface location to visually indicate the presence of the buried asset. The system 212 may include a spray paint container that includes spray paint under pressure, a valve for dispensing the spray, and a lever, peddle or switch for activating the valve for dispensing the spray. In another embodiment, the system 212 may include an automatically activated flag dispenser mechanism that, when activated, dispenses brightly colored flags that are stuck into the ground. Typically, this occurs when the ELD 210 has detected the presence of a buried asset at an above-surface location. Thus, the flags is placed at the above surface location to visually indicate the presence of the buried asset. The system 212 may include a flag dispenser mechanism that includes rod or shaft that inserts flags into the ground (wherein the shaft of the flag pole is stuck into the ground), and a lever, peddle or switch for activating the mechanism for dispensing the flag.

The navigation system 206 may be configured for determining an above-surface location of the UAV. The ELD 210 may be configured for executing electromagnetic locating functions for detecting buried assets. The computing system 202 may be configured for receiving, via the wireless communications network 106, a first data structure that represents a two dimensional area comprising a buffer zone at an above-surface location, wherein the buffer zone corresponds to a particular buried asset sought by the UAV, and using the system 206 to navigate towards the buffer zone. The computing system 202 may also be configured for calculating an above-surface location of the UAV using the navigation system 206, determining whether the above-surface location of the UAV is located within the buffer zone represented by the first data structure, and if so, executing the electromagnetic locating functions of the ELD 210.

The computing system 202 may also be configured for utilizing the ELD 210 to detect and store a plurality of buried asset data points, wherein each buried asset data point comprises a geographical coordinate for the particular buried asset, wherein the plurality of buried asset data points correspond to analog radio frequency signals that were detected and read from the particular buried asset at the above-surface location, and utilizing the communications system 208 to transmit, via the wireless communications network, the buried asset data points.

The computing system 202 may also be configured for utilizing the system 206 for calculating an above-surface location of the UAV using the GNSS receiver and processor, and calculating a vector or heading towards the above-surface location of the buffer zone, and then transmitting commands to the locomotion system 204, so as to navigate the UAV to the vector or heading that was calculated.

Figure 3:
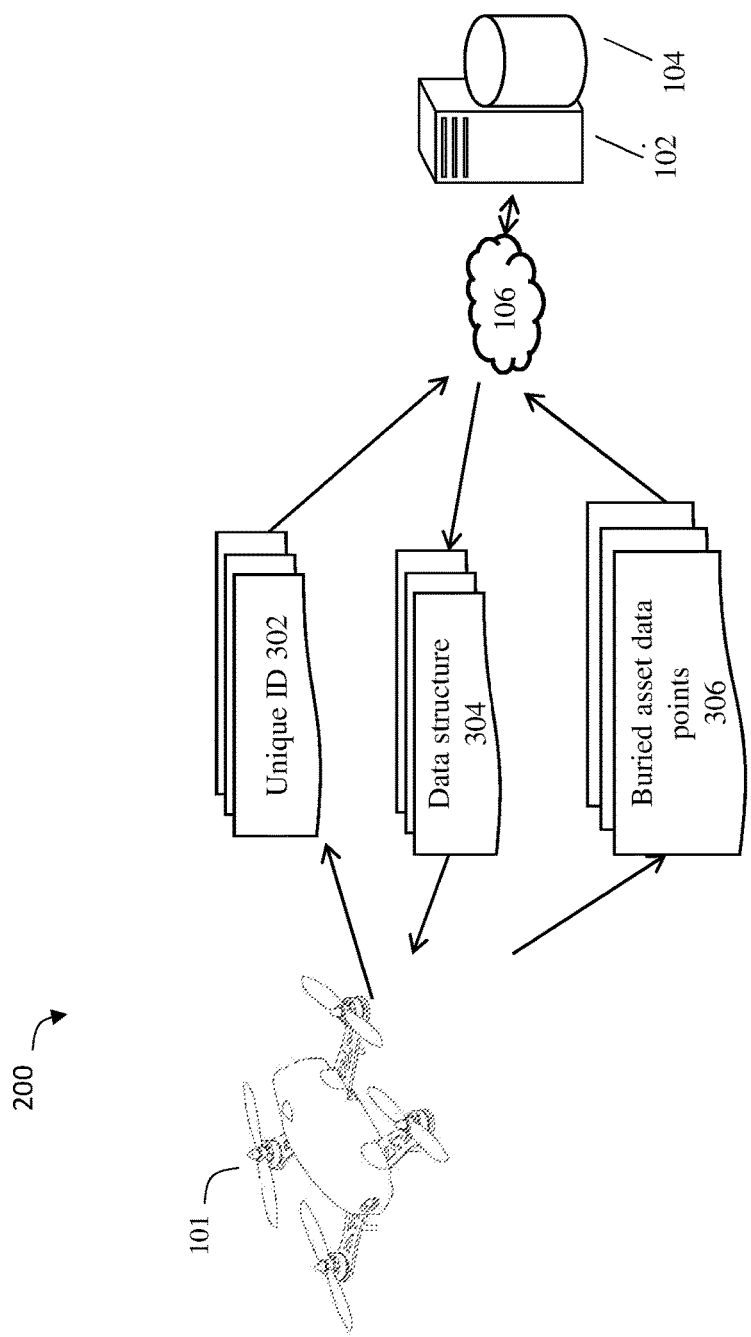
FIG. 3 is a diagram showing the data flow of the general process executed by the drone for detecting buried assets, according to an example embodiment.

FIG. 3 is a diagram showing the data flow of the general process executed by the drone 101 for detecting buried assets, according to an example embodiment. FIG. 3 shows that drone 101 may receive a data structure 304 that may include a buffer zone and geographical location, which correspond to a target buried asset. Also, drone 101 may transmit a unique identifier 302 that identifies a buried asset, and server 102 may respond with the data structure 304. The data structure 304 may be selected by manager 113. FIG. 3 also shows that drone 101 may transmit buried asset data points 306 to the server 102

Figure 4:
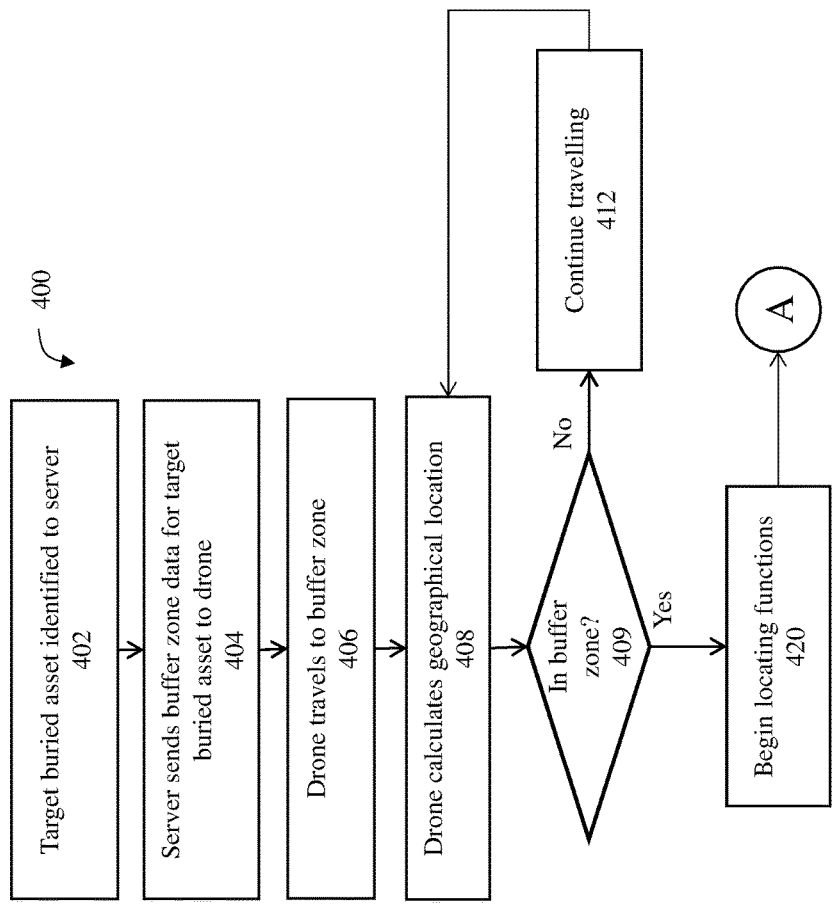
FIG. 4 is a first portion of a flow chart showing the control flow of the process executed by the drone for detecting buried assets, according to an example embodiment.
Figure 5:
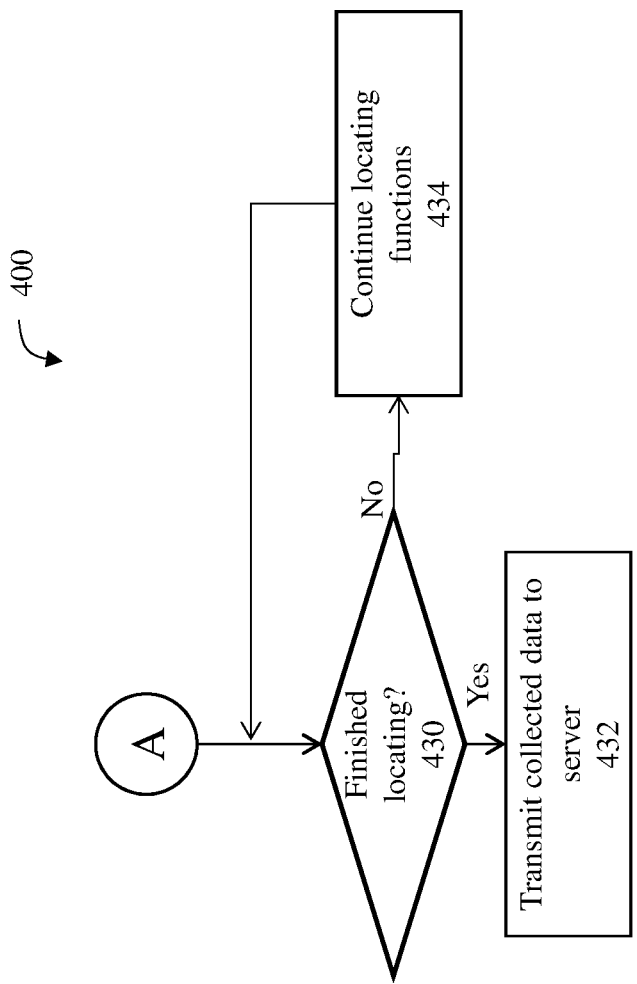
FIG. 5 is a second portion of the flow chart showing the control flow of the process executed by the drone for detecting buried assets, according to an example embodiment.

FIG. 4 is a first portion of a flow chart showing the control flow of the process executed by the drone 101 for detecting buried assets, according to an example embodiment. Process 400 describes the steps that occur when the drone 101 is seeking a particular target buried asset 130 (see FIG. 1) that may be located within a predefined buffer zone. The process 400 is described with reference to FIGS. 1-3.

Process 400 starts with step 402 wherein a target buried asset 130, which is the buried asset sought, is identified to the server 102. In one embodiment, this step is accomplished by the reception of the server 102 of a work ticket specifying that a locate action must be performed at a particular location for a particular buried asset identified by unique identifier 302, type of buried asset, expected reading for buried asset, or the like. In another embodiment, this step is accomplished by the server 102 receiving a command from the technician 113, or the device 101 may send a unique identifier 302 for the target buried asset to the server 102 via network 106. Step 402 may be performed automatically when the drone 101 arrives at the vicinity of the target buried asset (or the corresponding buffer zone), the drone sends its current geographical location to the server 102 and the server 102 determines which buried assets are located at said location.

In step 404, the server 102 accesses a record associated with the unique identifier, wherein the record includes previously recorded buried asset data points for the target buried asset or a previously calculated two-dimensional or three-dimensional buffer zone for the target buried asset. Also in step 404, the server sends to the drone 101, via network 106, a data structure 304 including buried asset data points for the target buried asset or a two-dimensional or three-dimensional buffer zone for the target buried asset, and optionally a geographical location for the target buried asset.

In step 406, the drone 101 receives and stores the data structure (buffer zone) and begins the process of travelling or navigating to the target buried asset. Specifically, in step 406, the drone 101 may execute a navigation process comprising: i) receiving, via the wireless communications network, a first data structure that represents a two dimensional area comprising a buffer zone at an above-surface location, wherein the buffer zone corresponds to a particular buried asset sought by the UAV; and ii) navigating towards the buffer zone. This step may comprise utilizing the system 206 for calculating an above-surface location of the UAV using the GNSS receiver and processor, and calculating a vector or heading towards the above-surface location of the buffer zone, and then transmitting commands to the locomotion system 204, so as to navigate the UAV to the vector or heading that was calculated.

In step 408, the drone 101 calculates current geographical information for the drone, using methods as disclosed above.

In step 409, the drone 101 determines whether the current geographical location of the drone 101 is located within the buffer zone.

If the current geographical location of drone 101 is not located within the buffer zone, then in step 412 the drone 101 continues travelling or navigating to the target buried asset and control flows back to step 408. If the current geographical location of drone 101 is located within the buffer zone, then in step 420 the locating functions of ELD 210 are enabled and begin executing. In step 420, the ELD 210 utilizes its antennas to read raw analog signals 140 emanating from the target buried asset 130. Based on the data it has received and calculated, ELD 210 calculates one or more buried asset data points 306 for the target buried asset.

More specifically, in steps 408-409 and 420, the drone 101 executes a status process comprising: i) calculating an above-surface location of the UAV using the GNSS receiver and processor; ii) determining whether the above-surface location of the UAV is located within the two dimensional area represented by the first data structure; and iii) if the above-surface location is located within the two dimensional area, executing the electromagnetic locating functions of the ELD.

As described above, the locating functions of ELD 210, or the term "locating functions" or "electromagnetic locating functions", shall refer to those functions of the ELD 210 (or any conventional locator device) that performs electromagnetic signal sensing or detecting functions for the purpose of detecting and marking buried assets. In another embodiment, the locating functions of ELD 210, however, may include a bundle of various different sensing and measurement activities or functions, such as measuring current time, geographical coordinate, electromagnetic signal measurement, etc.

In step 430, the drone 101 determines whether it is finished with its locating functions. If so, in step 432 the drone 101 uploads the buried asset data points to the server 102 via the network 106. If not, the drone 101 continues its locating functions in step 434 and control flows back to step 430.

Specifically, in steps 420-432, the drone 101 executes a detection process comprising: i) receiving and storing a plurality of buried asset data points, wherein each buried asset data point comprises a geographical coordinate for the particular buried asset, wherein the plurality of buried asset data points correspond to analog radio frequency signals that were detected and read from the particular buried asset at the above-surface location; and ii) transmitting, via the wireless communications network, the buried asset data points.

Figure 6:
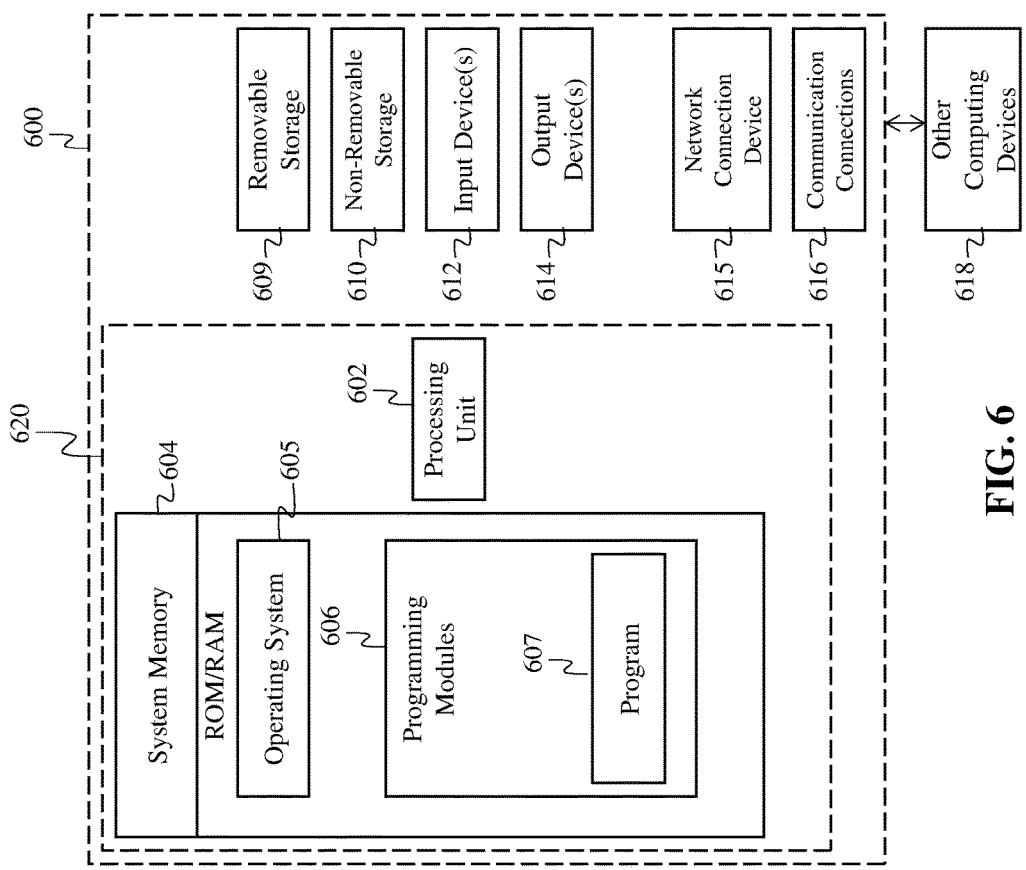
FIG. 6 is a block diagram of an example computing device, according to an example embodiment.

FIG. 6 is a block diagram of a system including an example computing device 600 and other computing devices. Consistent with the embodiments described herein, the aforementioned actions performed by server 102, device 122, and drone 101 may be implemented in a computing device, such as the computing device 600 of FIG. 6. Any suitable combination of hardware, software, or firmware may be used to implement the computing device 600. The aforementioned system, device, and processors are examples and other systems, devices, and processors may comprise the aforementioned computing device. Furthermore, computing device 600 may comprise an operating environment for system 100 and process 400, as described above. Process 400 may operate in other environments and are not limited to computing device 600.

With reference to FIG. 6, a system consistent with an embodiment disclosed herein may include a plurality of computing devices, such as computing device 600. In a basic configuration, computing device 600 may include at least one processing unit 602 and a system memory 604. Depending on the configuration and type of computing device, system memory 604 may comprise, but is not limited to, volatile (e.g. random access memory (RAM)), nonvolatile (e.g. read-only memory (ROM)), flash memory, or any combination or memory. System memory 604 may include operating system 605, and one or more programming modules 606. Operating system 605, for example, may be suitable for controlling computing device 600's operation. In one embodiment, programming modules 606 may include, for example, a program module 607 for executing the actions of server 102, drone 101 and device 122. Furthermore, embodiments disclosed herein may be practiced in conjunction with a graphics library, other operating systems, or any other application program and is not limited to any particular application or system. This basic configuration is illustrated in FIG. 6 by those components within a dashed line 620.

Computing device 600 may have additional features or functionality. For example, computing device 600 may also include additional data storage devices (removable and/or non-removable) such as, for example, magnetic disks, optical disks, or tape. Such additional storage is illustrated in FIG. 6 by a removable storage 609 and a non-removable storage 610. Computer storage media may include volatile and nonvolatile, removable and non-removable media implemented in any method or technology for storage of information, such as computer readable instructions, data structures, program modules, or other data. System memory 604, removable storage 609, and non-removable storage 610 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 600. Any such computer storage media may be part of device 600. Computing device 600 may also have input device(s) 612 such as a keyboard, a mouse, a pen, a sound input device, a camera, a touch input device, etc. Output device(s) 614 such as a display, speakers, a printer, etc. may also be included. The aforementioned devices are only examples, and other devices may be added or substituted.

Computing device 600 may also contain a communication connection 616 that may allow device 600 to communicate with other computing devices 618, such as over a network in a distributed computing environment, for example, an intranet or the Internet. Communication connection 616 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 604, including operating system 605. While executing on processing unit 602, programming modules 606 (e.g. program module 607) may perform processes including, for example, one or more of the stages of the process 600 as described above. The aforementioned processes are examples, and processing unit 602 may perform other processes. Other programming modules that may be used in accordance with embodiments disclosed herein may include electronic mail and contacts applications, word processing applications, spreadsheet applications, database applications, slide presentation applications, drawing or computer-aided application programs, etc.

Generally, consistent with embodiments disclosed herein, program modules may include routines, programs, components, data structures, and other types of structures that may perform particular tasks or that may implement particular abstract data types. Moreover, embodiments disclosed herein may be practiced with other computer system configurations, including hand-held devices, multiprocessor systems, microprocessor-based or programmable consumer electronics, minicomputers, mainframe computers, and the like. Embodiments disclosed herein may also be practiced in distributed computing environments where tasks are performed by remote processing devices that are linked through a communications network. In a distributed computing environment, program modules may be located in both local and remote memory storage devices.

Furthermore, embodiments disclosed herein may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments disclosed herein may also be practiced using other technologies capable of performing logical operations such as, for example, AND, OR, and NOT, including but not limited to mechanical, optical, fluidic, and quantum technologies. In addition, embodiments disclosed herein may be practiced within a general purpose computer or in any other circuits or systems.

Embodiments disclosed herein, for example, are described above with reference to block diagrams and/or operational illustrations of methods, systems, and computer program products. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments have been described, other embodiments may exist. Furthermore, although embodiments have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An unmanned aerial vehicle (UAV) for detecting buried assets, the UAV comprising:
    a UAV chassis;
    a global navigation satellite system (GNSS) receiver and processor positioned on the chassis, the GNSS receiver and processor configured for determining an above-surface location of the UAV;
    an electromagnetic locator device (ELD) positioned on the chassis, the ELD configured for executing electromagnetic locating functions for detecting buried assets;
    a processor positioned on the chassis, the processor communicatively coupled with a wireless communications network, the UAV, the GNSS receiver and processor, and the ELD, the processor configured for:
        executing a navigation process comprising: i) receiving, via the wireless communications network, a first data structure that represents a two dimensional area comprising a buffer zone at an above-surface location, wherein the buffer zone corresponds to a particular buried asset sought by the UAV; and ii) navigating towards the buffer zone;
        executing a status process comprising: i) calculating an above-surface location of the UAV using the GNSS receiver and processor; ii) determining whether the above-surface location of the UAV is located within the two dimensional area represented by the first data structure; iii) if the above-surface location is located within the two dimensional area, executing the electromagnetic locating functions of the ELD; and
        executing a detection process comprising: i) receiving and storing a plurality of buried asset data points, wherein each buried asset data point comprises a geographical coordinate for the particular buried asset, wherein the plurality of buried asset data points correspond to analog radio frequency signals that were detected and read from the particular buried asset at the above-surface location; and ii) transmitting, via the wireless communications network, the buried asset data points.

2. The UAV of claim 1, further comprising a step, before the first step of receiving the first data structure, comprising:
    transmitting, via the wireless communications network, a unique identifier for the particular buried asset sought by the UAV.

3. The UAV of claim 2, wherein the UAV further comprises:
    a locomotion system configured for accepting commands from the processor, so as to navigate the UAV to a predefined destination.

4. The UAV of claim 3, wherein the step of navigating towards the buffer zone further comprises:
    calculating an above-surface location of the UAV using the GNSS receiver and processor;
    calculating a vector towards the above-surface location of the buffer zone;
    transmitting commands to the locomotion system, so as to navigate the UAV to the vector that was calculated.

5. The UAV of claim 4, wherein the detection process further comprises
    i) receiving and storing a depth measurement corresponding to each of said plurality of buried asset data points; and ii) transmitting, via the wireless communications network, the depth measurements corresponding to each of said plurality of buried asset data points.

6. The UAV of claim 5, wherein the detection process further comprises
i) receiving and storing an electrical current measurement corresponding to each of said plurality of buried asset data points; and ii) transmitting, via the wireless communications network, the electrical current measurements corresponding to each of said plurality of buried asset data points.

7. An unmanned aerial vehicle (UAV) for detecting buried assets, the UAV comprising:
a UAV chassis;
a global navigation satellite system (GNSS) receiver and processor positioned on the chassis, the GNSS receiver and processor configured for determining an above-surface location of the UAV;
an electromagnetic locator device (ELD) positioned on the chassis, the ELD configured for executing electromagnetic locating functions for detecting buried assets;
a marking mechanism positioned on the chassis, the marking mechanism configured for automatically placing paint marks on a ground surface;
a processor positioned on the chassis, the processor communicatively coupled with a wireless communications network, the UAV, the GNSS receiver and processor, the marking mechanism and the ELD, the processor configured for:
executing a navigation process comprising: i) receiving, via the wireless communications network, a first data structure that represents a two dimensional area comprising a buffer zone at an above-surface location, wherein the buffer zone corresponds to a particular buried asset sought by the UAV; and ii) navigating towards the buffer zone;
executing a status process comprising: i) calculating an above-surface location of the UAV using the GNSS receiver and processor; ii) determining whether the above-surface location of the UAV is located within the two dimensional area represented by the first data structure; iii) if the above-surface location is located within the two dimensional area, executing the electromagnetic locating functions of the ELD; and
executing a detection process comprising: i) receiving and storing a plurality of buried asset data points, wherein each buried asset data point comprises a geographical coordinate for the particular buried asset, wherein the plurality of buried asset data points correspond to analog radio frequency signals that were detected and read from the particular buried asset at the above-surface location; ii) activating the marking mechanism for placing a paint mark on a ground surface for each buried asset data point, and iii) transmitting, via the wireless communications network, the buried asset data points.

8. The UAV of claim 7, further comprising a step, before the first step of receiving the first data structure, comprising:
transmitting, via the wireless communications network, a unique identifier for the particular buried asset sought by the UAV.

9. The UAV of claim 8, wherein the UAV further comprises:
a locomotion system configured for accepting commands from the processor, so as to navigate the UAV to a predefined destination.

10. The UAV of claim 9, wherein the step of navigating towards the buffer zone further comprises:
calculating an above-surface location of the UAV using the GNSS receiver and processor;
calculating a vector towards the above-surface location of the buffer zone;
transmitting commands to the locomotion system, so as to navigate the UAV to the vector that was calculated.

11. The UAV of claim 10, wherein the detection process further comprises
i) receiving and storing a depth measurement corresponding to each of said plurality of buried asset data points; and ii) transmitting, via the wireless communications network, the depth measurements corresponding to each of said plurality of buried asset data points.

12. The UAV of claim 11, wherein the detection process further comprises
i) receiving and storing an electrical current measurement corresponding to each of said plurality of buried asset data points; and ii) transmitting, via the wireless communications network, the electrical current measurements corresponding to each of said plurality of buried asset data points.

13. An unmanned aerial vehicle (UAV) for detecting buried assets, the UAV comprising:
a UAV chassis;
a global navigation satellite system (GNSS) receiver and processor positioned on the chassis, the GNSS receiver and processor configured for determining an above-surface location of the UAV;
an electromagnetic locator device (ELD) positioned on the chassis, the ELD configured for executing electromagnetic locating functions for detecting buried assets;
a marking mechanism positioned on the chassis, the marking mechanism configured for automatically inserting flags on a ground surface;
a processor positioned on the chassis, the processor communicatively coupled with a wireless communications network, the UAV, the GNSS receiver and processor, the marking mechanism and the ELD, the processor configured for:
executing a navigation process comprising: i) receiving, via the wireless communications network, a first data structure that represents a two dimensional area comprising a buffer zone at an above-surface location, wherein the buffer zone corresponds to a particular buried asset sought by the UAV; and ii) navigating towards the buffer zone;
executing a status process comprising: i) calculating an above-surface location of the UAV using the GNSS receiver and processor; ii) determining whether the above-surface location of the UAV is located within the two dimensional area represented by the first data structure; iii) if the above-surface location is located within the two dimensional area, executing the electromagnetic locating functions of the ELD; and
executing a detection process comprising: i) receiving and storing a plurality of buried asset data points, wherein each buried asset data point comprises a geographical coordinate for the particular buried asset, wherein the plurality of buried asset data points correspond to analog radio frequency signals that were detected and read from the particular buried asset at the above-surface location; ii) activating the marking mechanism for placing a flag on a ground surface for each buried asset data point, and iii) transmitting, via the wireless communications network, the buried asset data points.

14. The UAV of claim 13, further comprising a step, before the first step of receiving the first data structure, comprising:

transmitting, via the wireless communications network, a unique identifier for the particular buried asset sought by the UAV.

15. The UAV of claim 14, wherein the UAV further comprises:

a locomotion system configured for accepting commands from the processor, so as to navigate the UAV to a predefined destination.

16. The UAV of claim 15, wherein the step of navigating towards the buffer zone further comprises:

calculating an above-surface location of the UAV using the GNSS receiver and processor;

calculating a vector towards the above-surface location of the buffer zone;

transmitting commands to the locomotion system, so as to navigate the UAV to the vector that was calculated.

17. The UAV of claim 16, wherein the detection process further comprises i) receiving and storing a depth measurement corresponding to each of said plurality of buried asset data points; and ii) transmitting, via the wireless communications network, the depth measurements corresponding to each of said plurality of buried asset data points.

18. The UAV of claim 17, wherein the detection process further comprises i) receiving and storing an electrical current measurement corresponding to each of said plurality of buried asset data points; and ii) transmitting, via the wireless communications network, the electrical current measurements corresponding to each of said plurality of buried asset data points.

* * * * *